(12) United States Patent
Lin (10) Patent No.: US 7,322,266 B2
(45) Date of Patent: Jan. 29, 2008

(54) TABLE SAW HAVING A SCALE DEVICE (75) Inventor: Yi-Yuan Lin, Taichung County (TW)

(73) Assignee: Rexon Industrial Corp., Ltd., Taichung (TW)

( * ) Notice: Subject to any disclaimer, the term of this patent is extended or adjusted under 35 U.S.C. 154(b) by 72 days.

(21) Appl. No.: 11/177,105

(22) Filed: Jul. 7, 2005

(65) Prior Publication Data

US 2007/0006703 A1    Jan. 11, 2007

(30) Foreign Application Priority Data

Oct. 11, 2004   (TW) .............................. 93216109 U (51) Int. Cl.
B27B 27/02 (2006.01)
B23D 45/06 (2006.01)
B26D 7/27 (2006.01)

(52) U.S. Cl. .................. 83/522.11; 83/468; 83/522.18; 83/522.19; 83/522.21; 83/438; 83/468.7; 83/477.2; 144/287; 33/494; 33/679.1

(58) Field of Classification Search ............ 83/522.11, 83/468, 477.2, 438, 522.19, 522.18, 468.7, 83/468.1, 471.2, 522, 522.21, 522.15; 33/494, 33/679.1, 640, 809, 810, 668, 768, 769, 137–140; 30/371, 374, 388–391; 269/315–320; 144/287
See application file for complete search history.

(56) References Cited

U.S. PATENT DOCUMENTS

| | | | | |
|---|---|---|---|---|
| 2,619,134 A | * | 11/1952 | West ............................ 83/468 |
| 2,731,989 A | * | 1/1956 | Valcourt et al. ............. 269/315 |
| 2,744,549 A | * | 5/1956 | Johnson ........................ 83/438 |
| 2,745,447 A | * | 5/1956 | Studley, Jr. .............. 83/435.11 |
| 2,780,870 A | * | 2/1957 | Clor ............................. 33/640 |
| 2,806,493 A | * | 9/1957 | Gaskell ........................ 83/438 |
| 2,808,084 A | * | 10/1957 | Eschenburg et al. .......... 83/438 |
| 4,557,170 A | * | 12/1985 | Ingham ........................ 83/468 |
| 5,197,365 A | * | 3/1993 | Clifton ......................... 83/468 |
| 5,390,425 A | * | 2/1995 | Gilberts ........................ 33/764 |
| 6,148,703 A | * | 11/2000 | Ceroll et al. .................... 83/13 |
| 6,581,655 B2 | * | 6/2003 | Huang ......................... 144/287 |
| 6,786,122 B2 | * | 9/2004 | Svetlik ......................... 83/468 |
| 2002/0078810 A1 | * | 6/2002 | Talesky et al. ............... 83/438 |
| 2005/0172773 A1 | * | 8/2005 | Ku et al. ...................... 83/438 |
| 2005/0204883 A1 | * | 9/2005 | Huang .......................... 83/438 |

* cited by examiner

Primary Examiner—Boyer D. Ashley
Assistant Examiner—Ghassem Alie
(74) Attorney, Agent, or Firm—Bacon & Thomas, PLLC (57) ABSTRACT

A table saw includes a stationary table, a movable table linearly movable relative to the stationary table, a rip fence movable relative to the stationary table and the movable table, and a scale device mounted between the stationary table and the movable table and including a tape measure secured on the movable table to move therewith and having a retractable tape having a distal end secured on the stationary table. Thus, when the movable table is pulled outward from the stationary table to fit a wooden workpiece having a longer cutting length, the user can read the values of the retractable tape of the tape measure of the scale device so as to obtain the cutting length of the wooden workpiece directly.

15 Claims, 7 Drawing Sheets

TABLE SAW HAVING A SCALE DEVICE

BACKGROUND OF THE INVENTION

1. Field of the Invention

The present invention relates to a table saw, and more particularly to a table saw having a scale device.

2. Description of the Related Art

A conventional table saw comprises a stationary table, a circular blade rotatably mounted on the stationary table, a movable table linearly movable relative to the stationary table, a rip fence movable relative to the stationary table and the movable table to stop a wooden workpiece, such as a lumber or the like, and a scale mounted on the movable table and aligning with the stationary table to indicate a cutting length of the wooden workpiece.

The closest prior art of which the applicant is aware is disclosed in U.S. Pat. No. 6,786,122-B2 Svetlik, filed on Sep. 24, 2003, entitled "SCALE SYSTEM FOR USE WITH A MOVABLE TABLE".

SUMMARY OF THE INVENTION

The primary objective of the present invention is to provide a table saw having a scale device that can indicate the cutting length of a wooden workpiece directly and exactly, thereby facilitating a user reading the cutting length of the wooden workpiece.

Another objective of the present invention is to provide a table saw, wherein when the movable table is pulled to move outward from the stationary table to fit a wooden workpiece having a longer cutting length, the user can read the values of the retractable tape of the tape measure of the scale device so as to obtain the cutting length of the wooden workpiece directly.

A further objective of the present invention is to provide a table saw, wherein the retractable tape of the tape measure of the scale device indicates the longer cutting length of the wooden workpiece exactly, thereby enhancing the working efficiency of the table saw.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-5, a table saw in accordance with the preferred embodiment of the present invention comprises a stationary table 10 provided with two spaced support rails 15 (see FIG. 2A) located at two opposite sides thereof, a circular blade 11 rotatably mounted on a central portion of the stationary table 10, a movable table 20 linearly movable relative to the stationary table 10, a rip fence 30 movable relative to the stationary table 10 and the movable table 20 to stop a wooden workpiece, such as a lumber or the like, and a scale device 40 mounted between the stationary table 10 and the movable table 20 and including a tape measure 41 secured on the movable table 20 to move therewith and having a retractable tape 42 having a distal end secured on the stationary table 10.

The movable table 20 is substantially U-shaped and includes a first guide track 25 and a second guide track 251 each slidably mounted on a respective one of the two support rails 15 of the stationary table 10, and a support plate 21 mounted between the first guide track 25 and the second guide track 251.

A locking handle 26 is pivotally mounted on a bottom of the stationary table 10 to lock/unlock the first guide track 25 of the movable table 20 so as to lock the movable table 20 on the stationary table 10 when the movable table 20 is movable relative to the stationary table 10 to a determined position.

The first guide track 25 of the movable table 20 has an upper face provided with a dual scale 27 having a first end formed with a first scale zone 270 and a second end formed with a second scale zone 271. Each of the first scale zone 270 and the second scale zone 271 of the dual scale 27 has a plurality of markings whose values are gradually increased from a mediate portion of the dual scale 27 to two ends of the dual scale 27. The first guide track 25 of the movable table 20 has an outer side formed with a first slideway 28, and the second guide track 251 of the movable table 20 has an outer side formed with a second slideway 281 (see FIG. 2A).

The rip fence 30 includes a fence 31 slidably mounted on the stationary table 10 and the support plate 21 of the movable table 20, a width adjustment seat 32 mounted on a first end of the fence 31 and slidably mounted on the first guide track 25 of the movable table 20, a clamping clip 35 mounted on a second end of the fence 31 and slidably mounted on the second guide track 251 of the movable table 20, a front scale indication member 33 mounted on the width adjustment seat 32 and aligning with the dual scale 27 of the first guide track 25 of the movable table 20, and a locking handle 37 pivotally mounted on the first end of the fence 31 to lock/unlock the rip fence 30 on the movable table 20. The front scale indication member 33 is provided with a pointer 330 to facilitate a user reading the value on the dual scale 27.

The width adjustment seat 32 of the rip fence 30 has an inner side formed with a first slide 34 slidably mounted in the first slideway 28 of the first guide track 25 of the movable table 20, and the clamping clip 35 has an inner side formed with a second slide 36 slidably mounted in the second slideway 281 of the second guide track 251 of the movable table 20.

Thus, the rip fence 30 is movable relative to the movable table 20. When the rip fence 30 is movable relative to the movable table 20 to a determined position, the locking handle 37 of the rip fence 30 is pressed downward, so that the rip fence 30 is secured on the first guide track 25 and the second guide track 251 of the movable table 20 by the clamping effect of the clamping clip 35.

The tape measure 41 of the scale device 40 is secured on a bottom of the support plate 21 of the movable table 20 to move therewith and located adjacent to the second guide track 251 of the movable table 20. The retractable tape 42 of the tape measure 41 of the scale device 40 has a first end retractably extended from the tape measure 41 and a second end secured to one of the two support rails 15 of the stationary table 10, so that when the retractable tape 42 is pulled outward from the tape measure 41, the retractable tape 42 is rested on an inner side of the second guide track 251 of the movable table 20.

The retractable tape 42 of the tape measure 41 of the scale device 40 has a plurality of markings 420 to function as a basis of reading and adjustment of a cutting length of the wooden workpiece. The retractable tape 42 of the tape measure 41 of the scale device 40 has an initial marking 422 corresponding to a final marking 2702 of the first scale zone 270 of the dual scale 27. For example, the final marking 2702 of the first scale zone 270 of the dual scale 27 is thirteen inches (13 in.), and the initial marking 422 of the retractable tape 42 of the tape measure 41 of the scale device 40 is also thirteen inches (13 in.).

The support plate 21 of the movable table 20 has an end face formed with a recess 22 (see FIG. 4) located adjacent to the second guide track 251. The tape measure 41 of the scale device 40 further includes a rear scale indication member 45 mounted in the recess 22 of the support plate 21 of the movable table 20 and aligned with the retractable tape 42 of the tape measure 41 of the scale device 40 to function as the basis of reading and adjustment of a longer cutting length of the wooden workpiece. The rear scale indication member 45 is provided with a pointer 450 to facilitate a user reading the values on the retractable tape 42 of the tape measure 41 of the scale device 40.

Thus, when the movable table 20 is pulled to move outward from the stationary table 10, the tape measure 41 of the scale device 40 is moved with the support plate 21 of the movable table 20 and the second end of the retractable tape 42 of the tape measure 41 is secured to the stationary table 10, so that the retractable tape 42 is pulled outward from the tape measure 41 to indicate the cutting length of the wooden workpiece.

Figure 5:
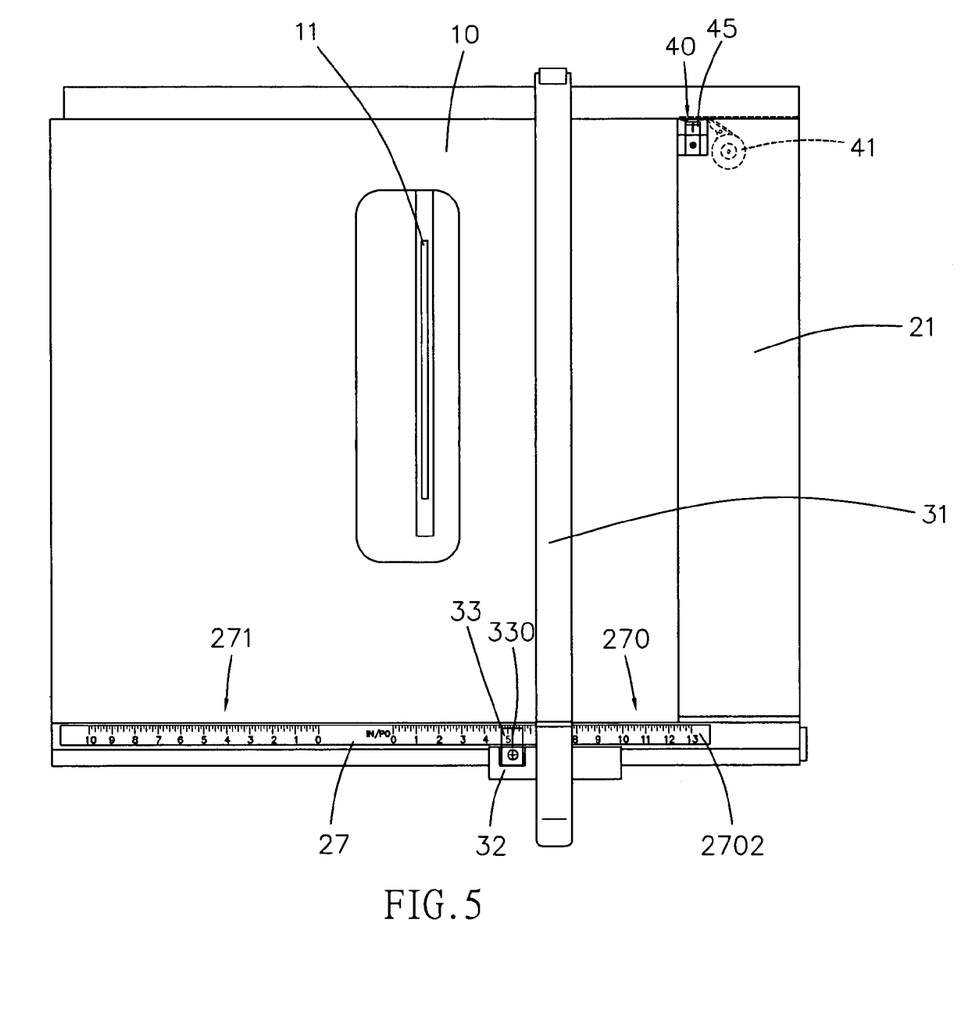
FIG. 5 is a top plan view of the table saw as shown in FIG. 1.

As shown in FIG. 5, when the cutting length of the wooden workpiece does not exceed the limits of the stationary table 10, the user only needs to adjust the position of the fence 31 of the rip fence 30 relative to the circular blade 11 to adjust the cutting length of the wooden workpiece. At this time, the front scale indication member 33 of the rip fence 30 aligns with one of the markings of the dual scale 27 of the first guide track 25 of the movable table 20 so as to indicate the cutting length of the wooden workpiece exactly.

Figure 6:
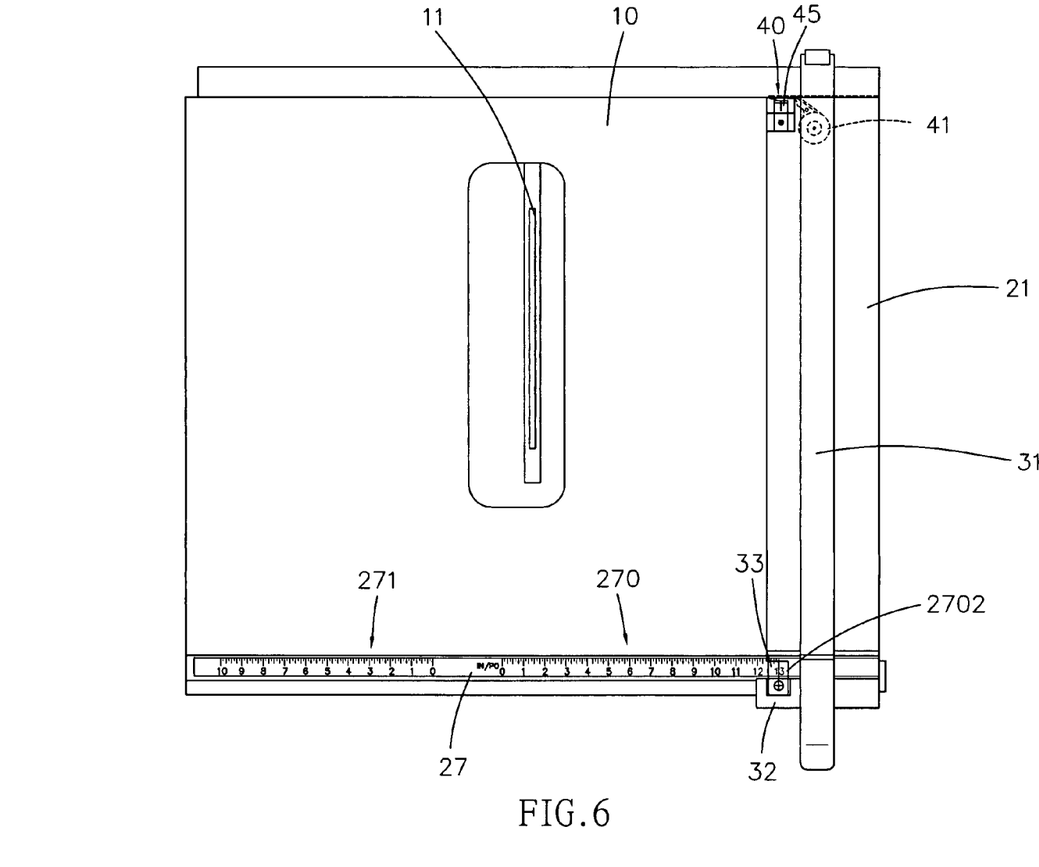
FIG. 6 is a schematic operational view of the table saw as shown in FIG. 5.

As shown in FIG. 6, when the fence 31 of the rip fence 30 is moved to the distal end of the stationary table 10, the front scale indication member 33 of the rip fence 30 aligns with and indicates the final marking 2702 of the first scale zone 270 of the dual scale 27.

Figure 7:
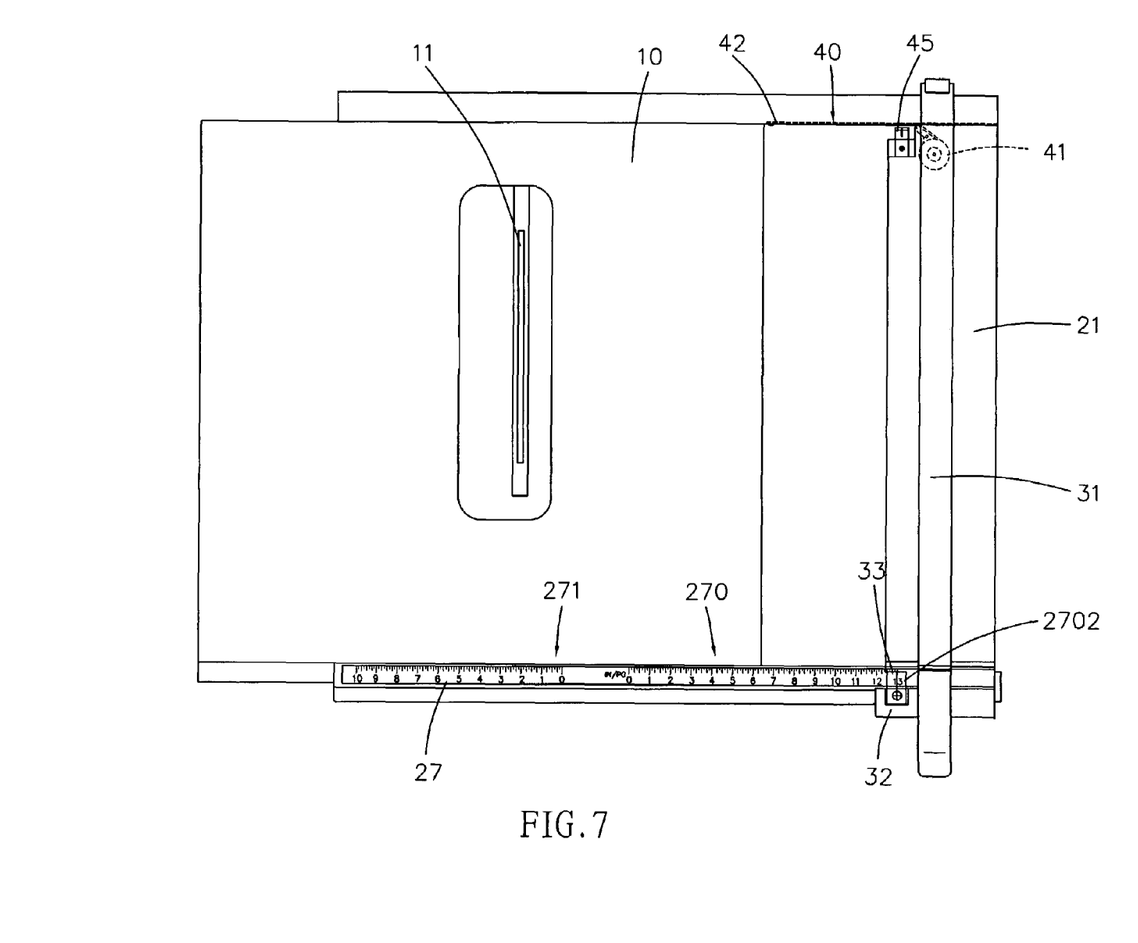
FIG. 7 is a schematic operational view of the table saw as shown in FIG. 6.

As shown in FIG. 7, when the cutting length of the wooden workpiece exceeds the limits of the stationary table 10, the movable table 20 is pulled to move outward from the stationary table 10. When the movable table 20 is pulled to move outward from the stationary table 10, the tape measure 41 of the scale device 40 is moved with the support plate 21 of the movable table 20 and the second end of the retractable tape 42 of the tape measure 41 is secured to the stationary table 10, so that the retractable tape 42 is pulled outward from the tape measure 41 to indicate the cutting length of the wooden workpiece.

Figure 1:
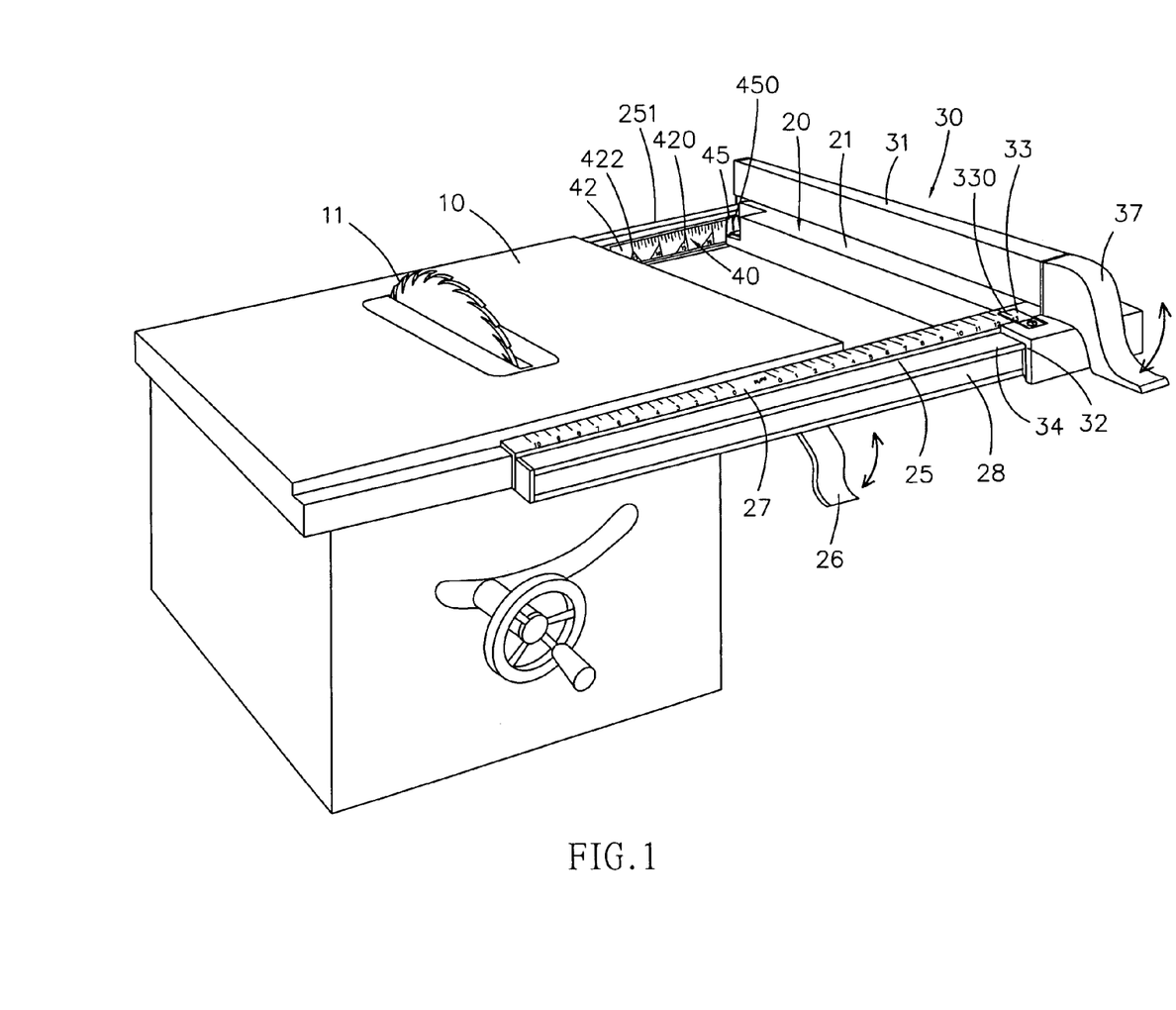
FIG. 1 is a perspective view of a table saw in accordance with the preferred embodiment of the present invention.
Figures 2, 2A:
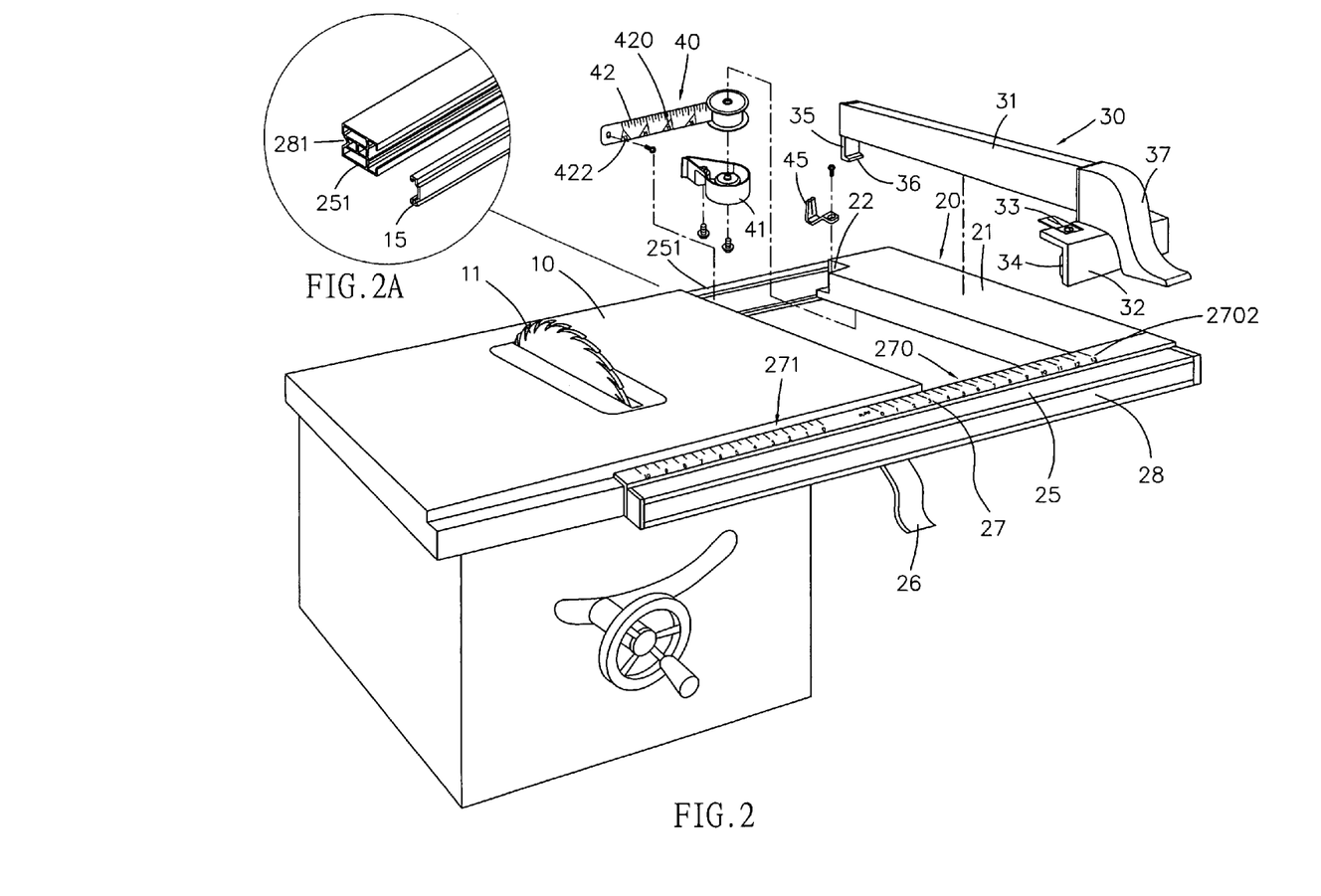
FIG. 2 is a partially exploded perspective view of the table saw as shown in FIG. 1.
FIG. 2A is a locally enlarged view of the table saw as shown in FIG. 2.
Figure 3:
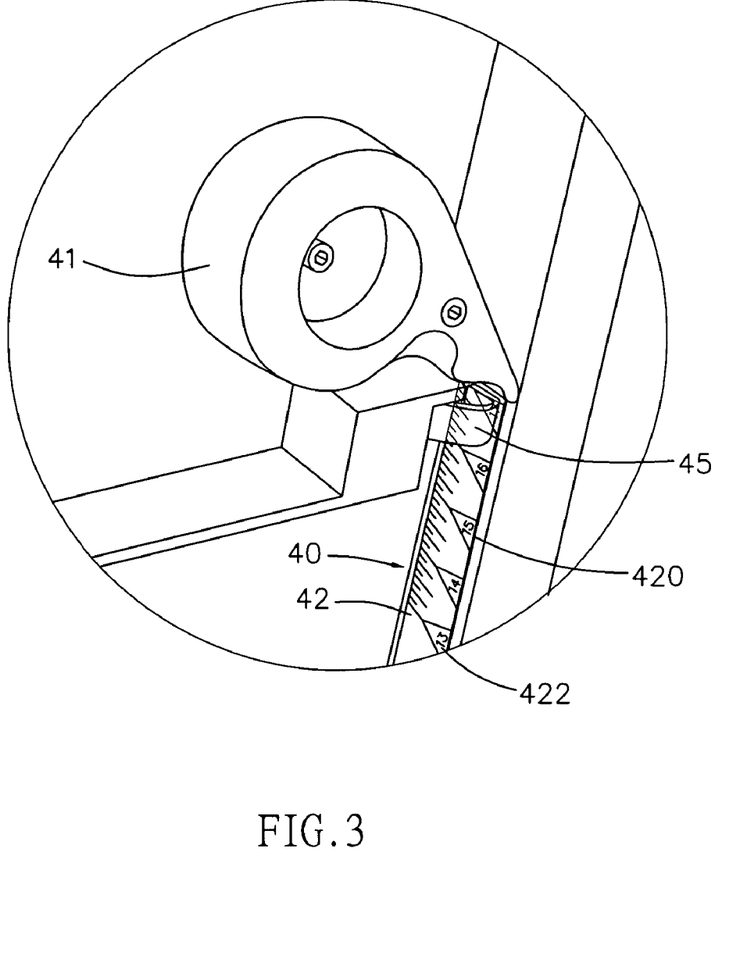
FIG. 3 is a locally enlarged bottom perspective view of the table saw as shown in FIG. 1.
Figure 4:
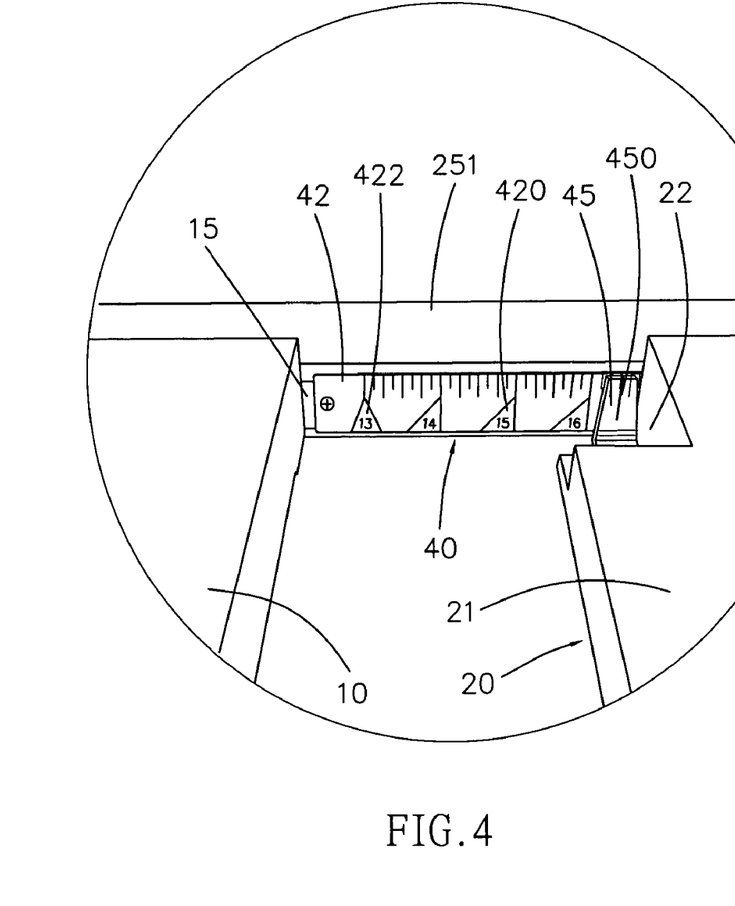
FIG. 4 is a locally enlarged perspective view of the table saw as shown in FIG. 1.

At this time, as shown in FIGS. 2 and 7, the retractable tape 42 of the tape measure 41 of the scale device 40 has an initial marking 422 matching the final marking 2702 of the first scale zone 270 of the dual scale 27, so that the user can read the values of the retractable tape 42 of the tape measure 41 by the rear scale indication member 45 so as to obtain the cutting length of the wooden workpiece directly.

Accordingly, when the movable table 20 is pulled to move outward from the stationary table 10 to fit a wooden workpiece having a longer cutting length, the user can read the values of the retractable tape 42 of the tape measure 41 of the scale device 40 so as to obtain the cutting length of the wooden workpiece directly. In addition, the retractable tape 42 of the tape measure 41 of the scale device 40 indicates the longer cutting length of the wooden workpiece exactly, thereby enhancing the working efficiency of the table saw.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A table saw, comprising:
   a stationary table;
   a movable table linearly movable relative to the stationary table;
   a rip fence movable relative to the stationary table and the movable table; and
   a scale device mounted between the stationary table and the movable table and including a tape measure secured on the movable table to move therewith and having a retractable tape having a distal end secured on the stationary table;
   wherein the movable table has an end face formed with a recess and the tape measure of the scale device further includes a rear scale indication member mounted in the recess of the movable table and aligned with the retractable tape of the tape measure of the scale device.

2. A table saw, comprising:
   a stationary table;
   a movable table linearly movable relative to the stationary table;
   a rip fence movable relative to the stationary table and the movable table; and
   a scale device mounted between the stationary table and the movable table and including a tape measure secured on the movable table to move therewith and having a retractable tape having a distal end secured on the stationary table;
   wherein the stationary table is provided with two spaced support rails located at two opposite sides thereof, and the movable table includes a first guide track and a second guide track each slidably mounted on a respective one of the two support rails of the stationary table, and a support plate mounted between the first guide track and the second guide track;
   wherein the support plate of the movable table has an end face formed with a recess located adjacent to the second guide track, and the tape measure of the scale device further includes a rear scale indication member mounted in the recess of the support plate of the movable table and aligned with the retractable tape of the tape measure of the scale device.

3. The table saw in accordance with claim 2, wherein the retractable tape of the tape measure of the scale device has a first end retractably extended from the tape measure and a second end secured to the stationary table.

4. The table saw in accordance with claim 2, wherein the movable table has an upper face provided with a scale, and the retractable tape of the tape measure of the scale device has an initial marking corresponding to a final marking of the scale of the movable table.

5. The table saw in accordance with claim 2, wherein the retractable tape of the tape measure of the scale device has a plurality of markings to function as a basis of reading and adjustment of a cutting length of a wooden workpiece.

6. The table saw in accordance with claim 2, wherein the tape measure of the scale device is secured on a bottom of the support plate of the movable table to move therewith and located adjacent to the second guide track of the movable table.

7. The table saw in accordance with claim 2, wherein the retractable tape of the tape measure of the scale device has a first end retractably extended from the tape measure and a second end secured to one of the two support rails of the stationary table.

8. The table saw in accordance with claim 2, wherein when the retractable tape is pulled outward from the tape measure, the retractable tape is rested on an inner side of the second guide track of the movable table.

9. The table saw in accordance with claim 2, wherein the first guide track of the movable table has an upper face provided with a dual scale having a first end formed with a first scale zone and a second end formed with a second scale zone.

10. The table saw in accordance with claim 9, wherein the retractable tape of the tape measure of the scale device has an initial marking corresponding to a final marking of the first scale zone of the dual scale.

11. The table saw in accordance with claim 9, wherein each of the first scale zone and the second scale zone of the dual scale has a plurality of markings whose values are gradually increased from a mediate portion of the dual scale to two ends of the dual scale.

12. The table saw in accordance with claim 9, wherein the rip fence includes a fence slidably mounted on the stationary table and the support plate of the movable table, a width adjustment seat mounted on a first end of the fence and slidably mounted on the first guide track of the movable table, and a front scale indication member mounted on the width adjustment seat and aligning with the dual scale of the first guide track of the movable table.

13. The table saw in accordance with claim 12, wherein the rip fence further includes a clamping clip mounted on a second end of the fence and slidably mounted on the second guide track of the movable table.

14. The table saw in accordance with claim 13, wherein the first guide track of the movable table has an outer side formed with a first slideway, the second guide track of the movable table has an outer side formed with a second slideway, the width adjustment seat of the rip fence has an inner side formed with a first slide slidably mounted in the first slideway of the first guide track of the movable table, and the clamping clip has an inner side formed with a second slide slidably mounted in the second slideway of the second guide track of the movable table.

15. The table saw in accordance with claim 12, wherein the rip fence further includes a locking handle pivotally mounted on the first end of the fence to lock/unlock the rip fence on the movable table.

* * * * *